May 28, 1963 R. C. CALE 3,091,206
HIGH SPEED PLANING HULL
Filed May 27, 1959 2 Sheets-Sheet 1

INVENTOR
Richard C. Cale

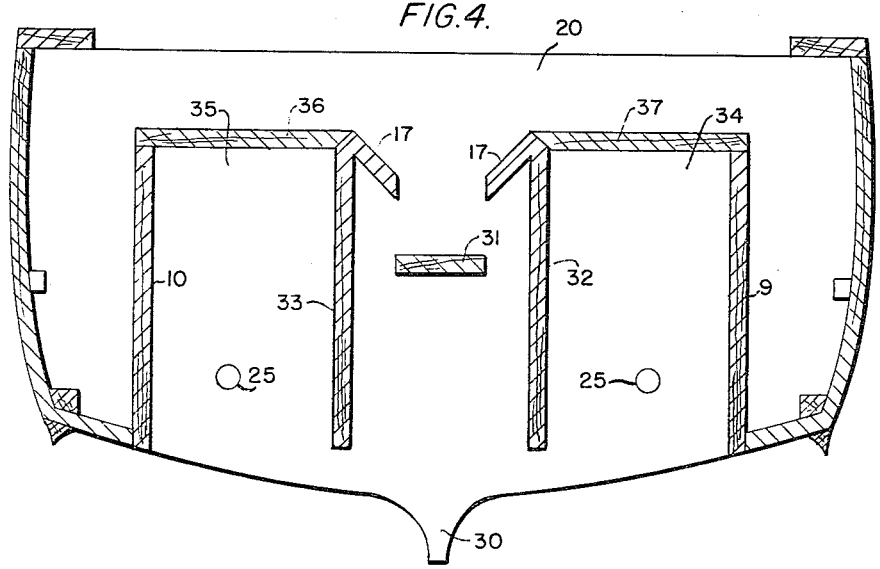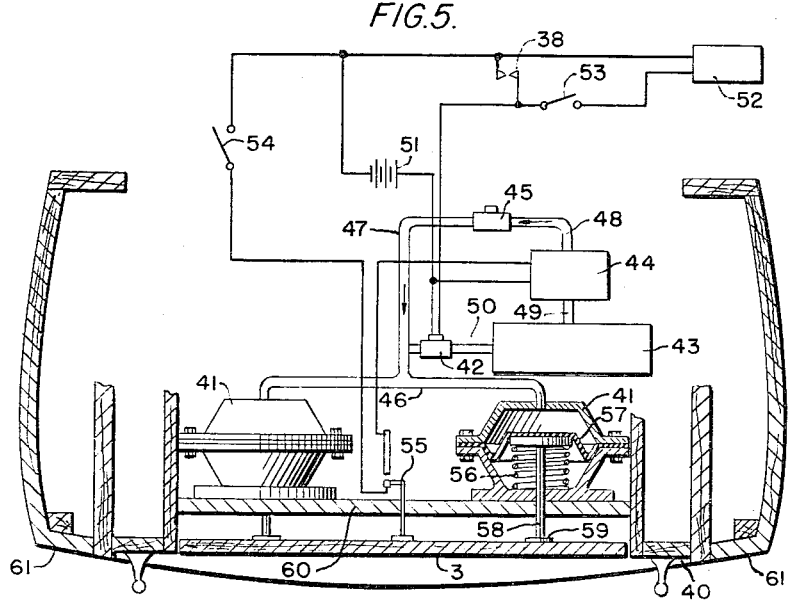

United States Patent Office 3,091,206
Patented May 28, 1963

3,091,206
HIGH SPEED PLANING HULL
Richard C. Cale, 1129 Swanston Drive, Sacramento, Calif.
Filed May 27, 1959, Ser. No. 816,171
10 Claims. (Cl. 114—66.5)

This invention relates generally to high speed planing craft and more particularly to such a craft having a stepped planing surface.

In a high speed planing boat the shape of the plane is the major controlling factor not only of the speed potential and riding qualities of the boat but also controls the vital fundamental of useful lift. Planing boats in use at the present time have hulls which are designed for a specific use, that is, for either relatively calm water or for seagoing use in rougher waters. For instance, a particular form of hull may add speed under some conditions, but if it detracts from lift under sea going conditions, the added speed is obtained at the expense of the seaworthiness of the craft. Many attempts have been made in hull construction to overcome these obvious disadvantages and to attain a multipurpose high speed craft. One such attempt is the use of a step or a series of steps in the planing surface of the hull. The primary purpose of these steps is to create a clean break in the planing surface and is put there for the purpose of reducing skin friction. Like the transom, a step ends a planing surface, and the theory is to cause the water to miss contact with the forward portion of the following plane. A substantial reduction in wetted surface can be achieved in this way under relatively smooth water conditions. Varying numbers of transverse steps have been tried in seagoing hulls, the purpose being to cut down the wetted surface, to break the suction under the afterbody and to increase lift by means of a series of leading edges. However, at the higher speeds it has been found that the increased suction effect caused by these steps has overcome any advantage attained by reducing the wetted surface and increasing the lift. If steps are to eliminate suction, they must be vented and, therefore, require positive ventilation. This requirement of positive ventilation has been the prime difficulty of stepped hulls at sea.

Two methods of venting have been tried with a limited degree of success. One such method is to have the vents open to the atmosphere on the side of the hull above the water line. In rough water, wave action frequently piles solid water above the side vent and thus suddenly changes the action of the step from reducing resistance, to a suction which enormously increases resistance. A second method of venting is accomplished by introducing air ducts through the bottom of the boat. The disadvantages of venting steps in this method has, in the past, been the costly construction necessary to overcome the structural weakness due to a sudden change in the sectional area.

Since properly vented steps decrease the planing angle of the boat, the hull tends to resist pitching and therefore the bow is driven directly into the waves. This very action has prevented stepped hulls from being considered as practical oceangoing vessels.

Accordingly, it is an object of this invention to provide a stepped hull construction which gives the advantages of the increased efficiency of the stepped hull and at the same time insures a seaworthy boat.

Another object of this invention is to provide variable venting means for varying water conditions.

A further object of this invention is to provide a boat having a stepped hull properly vented and yet which is structurally strong.

A still further object of this invention is to provide a seaworthy boat having a stepped hull construction which is easily built without structural complications.

Other objects will become apparent to those skilled in the art from the following description taken together with the accompanying drawings in which:

FIG. 4 is a sectional view of the hull taken along the sectional lines 4—4 of FIG. 2;

FIG. 5 is a sectional view of the hull taken along the sectional lines 5—5 of FIG. 2 and includes a diagrammatic showing of the control system for varying the angle of one of the steps.

For purposes of illustration, the invention has been shown as used on a monohedron hull. However, this invention is not limited to such a hull since the principles disclosed herein are applicable to any type of planing hull.

Figure 1:
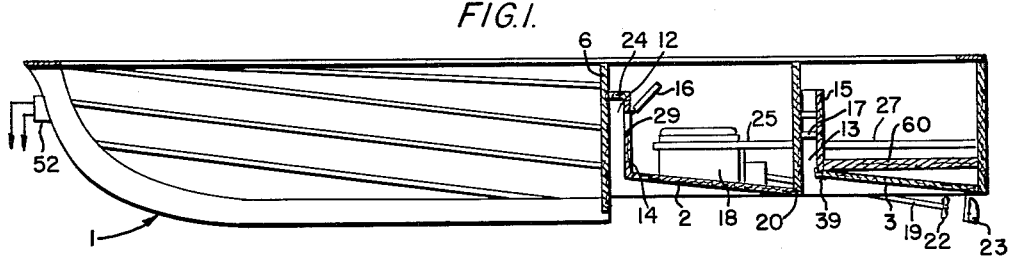
FIG. 1 is a side elevational view taken in section along the center line of the hull.

Turning now to a detailed description of the drawings wherein like figures are used for like elements FIG. 1 shows the basic design of the hull. The forward part of the hull follows the standard monohedron lines with the exception of the specially designed chine which will be described later. The hull 1 incorporates two steps 2 and 3 aft of the amidship beam. Each of these steps incline upwardly and forwardly above the plane of the chine 4. The steps 2 and 3 extend athwartships between longitudinal bulkheads 7, 8 and 9, 10 respectively. The surfaces of steps 2 and 3 do not extend the full athwartship distance, but stop substantially short of the chine 4 on either side of the hull. Planing surfaces 61 are smooth, continuous extensions of the forward planing surface. This construction gives additional structural strength to the hull, as compared to hulls having transverse steps extending from the port chine to the starboard chine. Surfaces 61 also eliminate water turbulence caused by a full athwartship step and, thus, increase the directional stability of the hull. Each of the step sections has a vent 12 and 13 respectively created by an athwartship bulkhead 14 and 15. These vents are normally open to the atmosphere and provide the air necessary to prevent the aforementioned suction created by the steps. Vent 29 may be closed off by cover 16 and vent 13 is provided with baffle 17. The function of both the cover and the baffles will become apparent as the description progresses. The motors 18 are mounted in the forward step compartment with the shafts 19 passing through the athwartship bulkhead 20 which separates the two step compartments. The shaft 19 is secured to the after step as is the rudder 23.

Figure 2:
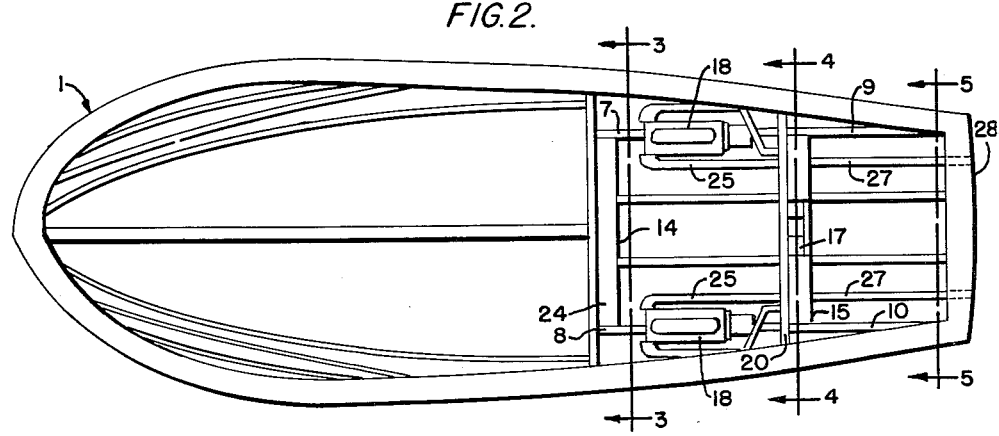
FIG. 2 is a plan view of the hull with the diagrammatic showing of each motor in place.

In the plan view of FIGURE 2 it can be seen that vent 12 is covered at the top by cover 24 with the ventilation taking place through the opening created by opening 29. The aftervent is open at its midsection but is baffled as more clearly appears in FIG. 4. The engine 18 is exhausted into vent 17 by means of the exhaust pipe 25. Ventpipe 27 connects the venting chambers 17 with the atmosphere in that it passes through bulkhead 15 and through transom 28. The same engine exhaust pipe-vent pipe combination appears on the starboard side of the boat but is not shown for the sake of clarity.

Figure 3:
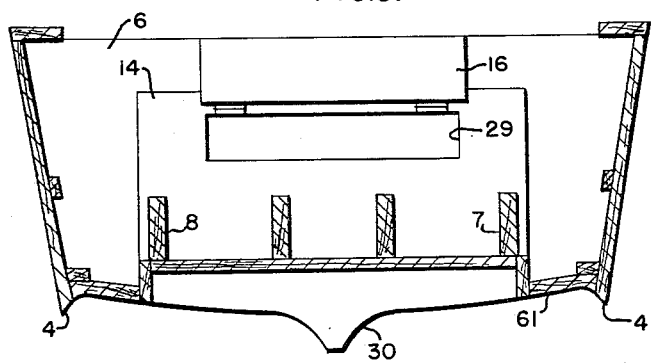
FIG. 3 is a sectional view of the hull taken along the section lines 3—3 of FIG. 2.

FIG. 3 shows the detail of bulkhead 14, cover 16 and vent opening 29. FIG. 3 additionally shows the specific structure of the chine 4. The extended structure of the chine, as shown, forces the water downwardly as the boat proceeds in a forward direction, thus giving additional lift to the planing hull. The chine further acts in much the same manner as does the keel 30 in that it cuts the water and gives a smooth directional flow along the outer surface of the hull, increasing directional stability of the craft.

FIG. 4 shows the details of bulkhead 20 with the angular baffles 17 and the horizontal baffle 31 mounted between bulkhead 20 and bulkhead 15. Beams 32 and 33 act as bracers between bulkhead 20 and bulkhead 15 and additionally separate the after venting area into three compartments. The two outer compartments 34 and 35 are closed off from the inside of the hull by covers 36 and 37. Under normal forward motion of the craft through the water, either slow or fast, there is no danger of water forcing its way up through the center compartment and into the hull itself. However, the baffles 17 and 31 are provided in order to prevent any splashing of water into the hull when the craft is backing down. When the boat is under way at high speeds there are three contributing factors which reduce the suction in the outer compartments 34 and 35. The exhaust of the engine is fed into these compartments through exhaust pipes 25, air is sucked into these compartments through vent pipes 27 and air will pass down through the central compartment and under beams 32 and 33 to supply any additional air required to prevent suction.

The after step 3 is mounted for movement about the lower portion of bulkhead 15 by means of a hinge member 39 as illustrated in FIG. 1. A diagrammatic showing of the control for hinge step 3 is illustrated in FIG. 5. As will be noted, a stationary step 40 is provided for mounting the shaft 19 and rudder 23 on the bottom of the hull. The bottom of step 40 is on the same plane as the bottom of step 3 when the latter is in its lowered position. Again, for purposes of clarity only a partial section is shown. The power drive for the raising and lowering of the step 3 about hinge 39 comprises the pressure actuated device 41, a similar device on the port side and the closed pressure system consisting of hydraulic pressure device 41, electrically operated valve 42, fluid reservoir 43, electric fluid pump 44, check valve 45 and the associated hydraulic tubing 46, 47, 48 and 49. The control means for this hydraulic system comprises battery 51, pressure actuated switch 52, manual switches 53, 54, 38 and motion limiting switch 55 and the associated electrical connections therefor.

Hydraulic pressure device 41 is mounted on support 60 with motion transferring shaft 58 passing through support 60 and being secured to step 3 as shown at 59.

The operation of the hydraulic system is as follows: Electric fluid pump 44 pumps fluid from reservoir 43 through check valve 45 in the direction as shown by the arrows. Check valve 45 assures that the fluid will not flow in the opposite direction. If electrically operated valve 42 is in the closed position the fluid will pass through line 47 and into line 46 to the two pressure operated devices. The pressure created is sufficient to overcome the upward force created on shaft 58 by spring 56 and drives the shaft in a downward direction thus forcing step 3 downward into operating position. If the electrically operated valve 42 is in its open position the fluid will be circulated continuously through lines 48, 47, 50 and 49 in which case there will be no pressure created in line 46. When this condition prevails, spring 56 forces shaft 58 upward thus bringing step 3 into contact with support member 60.

In order to activate the system, switch 54 is closed, completing the circuit through motor 44 which then begins pumping fluid from reservoir 43. The electrically operated valve 42 is in a closed position when it is not actuated. Therefore, pressure builds up in lines 47 and 46 and in the pressure actuated device 41. Step 3 is moved into a downward position until limit switch 55 is opened, removing the power supply to motor 44 and preventing an excessive build up of pressure. The pressure actuated switch 52 is mounted on the bow of the boat above the water line, and remains in an open position until the bow is submerged in a wave. The water pressure caused by the wave closes switch 52, actuating electrical valve 42 into an open position. With valve 42 in an open position the hydraulic fluid circulates through line 50 back into reservoir 43 thus relieving the pressure on line 46 and the pressure on hydraulic pressure device 41. Spring 56 now takes over and forces the step 3 upward into contact with support 60. Manual switch 53 provides a selective means for disconnecting the pressure actuated switch 52 in calm waters. Switch 38 provides a means for manually opening valve 42 in order to relieve the pressure when the system is not in use.

Thus it can be seen that provisions have been made for operating the planing boat of this invention in both smooth and rough water while maintaining the desirable characteristics for each of the two operations. When operating in smooth water, the forward vent remains open to provide the necessary ventilation for the forward step in order to eliminate the suction. The after step is in its lowered position in the same smooth water conditions. Therefore, the boat is operating with the desirable two step hull which reduces friction and creates two new leading edges, thus decreasing the angle of plane and adding to the speed of the craft. When the craft moves into rougher water it would perform unsatisfactorily if the effective planing surface were not altered due to the fact that the two step planing hull reduces the angle of plane and forces the craft to plough into the waves rather than ride over them. However, by automatic operation, as explained above, the angle of the after step surface is variable and pressure on the bow activates the pressure actuated switch and causes the trailing edge of the after step to be lifted into a horizontal position. This increases the angle of plane and causes the boat to ride over the waves, rather than through them. If the boat encounters an extremely rough sea the cover for the forward vent provides a means for cutting off this vent, creating a suction due to the unvented forward step. This suction is equivalent to an added ballast, but does not have the undesirable characteristics of added ballast. This suction effect also increases the angle of plane, making the boat extremely seaworthy in rough water due to its planing action over the waves.

Many modifications of this invention will occur to those familiar with this art in light of the present disclosure. Accordingly, the description and the drawings are illustrative only and I do not intend that I should be limited to the structure as shown.

What I claim is:

1. A planing hull comprising a plurality of transverse steps recessed into the planing surface, each of said steps being angularly inclined toward the stern of said hull, the width of said steps being substantially less than the width of said planing surface, venting means for reducing the negative pressure created by each of said steps, means for closing at least one of said venting means, adjusting means for varying the angle of inclination of one of said steps, control means for actuating said adjusting means, said control means being responsive to pressure changes at the bow of said hull.

2. A power boat having a planing hull comprising a plurality of steps located aft of the midship section of said hull, said steps having a width substantially less than the beam width of said hull, the surface of said steps being angularly inclined toward the stern of said hull, means for venting each of said steps within said hull, operable means for closing one of said vents, power means for adjusting the angular inclination of one of said steps, and control means for actuating said power means in accordance with the pressure exerted on the bow of said hull.

3. The apparatus of claim 2 wherein the venting means comprises an air duct through the bottom of said hull for each of said steps, said air ducts being open to the atmosphere, the forward wall of each air duct being in the same plane as the vertical portion of each of said steps.

4. The apparatus of claim 3 wherein the operable means for closing one of said vents comprises a hinged cover device for preventing air from entering said ducts when said cover device is in a position to cover said one of said vents.

5. A high speed planing hull comprising transverse steps centrally recessed within said hull and located aft of the midsection of the hull, means for venting said steps through the bottom of said hull, planing surfaces extending aft of each of said steps, power means for varying the position of the trailing edge of one of said steps and control means for automatically actuating said power means in response to excessive pressure on the bow of said hull.

6. The apparatus of claim 5 further comprising means for closing at least one of said venting means.

7. The apparatus of claim 5 wherein said venting means comprises an air duct for each of said vents, said air ducts being enclosed by athwartship bulkheads above the leading edge of said steps.

8. The apparatus of claim 5 wherein the power means comprises a pressure actuated device on the bow of the hull and a closed hydraulic pressure system coupled to said steps.

9. A high speed planing hull comprising transverse steps centrally located in the after planing surface, means for venting said steps through the bottom of the hull, power means for varying the position of the trailing edge of one of said steps, a manual switch, a pressure actuated switch on the bow of said hull and electrical circuit means for coupling said switches in an operative manner to said power means.

10. A planing hull comprising a continuous planing surface forward of the amidship beam including associated continuous chines, outer planing surfaces extending aft from said continuous planing surface, said outer surfaces having a substantial surface extending inwardly from the chines of said hull, a plurality of transverse steps recessed within said planing hull and located between said outer planing surfaces, inner planing surfaces extending aft of each of said steps and means for venting said steps within said hull, said continuous chines having an additional structure comprising downwardly extending elements, the outer part of said downwardly extending elements being a continuation of the outboard configuration of said hull and a concave surface joining the inner part of said extending elements to the planing surface of said hull.

References Cited in the file of this patent
UNITED STATES PATENTS

| | | |
|---|---|---|
| 928,579 | Apel | July 20, 1909 |
| 976,588 | Meldau | Nov. 22, 1910 |
| 1,161,896 | Sloper | Nov. 30, 1915 |
| 1,237,715 | Smith | Aug. 21, 1917 |
| 1,396,831 | Gardner | Nov. 15, 1921 |
| 1,637,677 | Bonnemaison | Aug. 2, 1927 |
| 1,824,313 | Vogler | Sept. 22, 1931 |
| 1,831,339 | Brush | Nov. 10, 1931 |
| 1,868,054 | Easthope | July 19, 1932 |
| 1,880,371 | Brush | Oct. 4, 1932 |
| 2,234,899 | Higgins | Mar. 11, 1941 |
| 2,336,987 | Garber et al. | Dec. 14, 1943 |
| 2,708,894 | Hook | May 24, 1955 |
| 2,709,979 | Bush et al. | June 7, 1955 |
| 2,890,671 | Hobday | June 16, 1959 |

FOREIGN PATENTS

| | | |
|---|---|---|
| 17,525 | Great Britain | of 1909 |